Feb. 18, 1958  SEIICHI SUZUKI  2,823,423
AUTOMATIC CARD STRIPPER
Filed May 24, 1954  7 Sheets-Sheet 1

SEIICHI SUZUKI
INVENTOR.

BY Wenderoth, Lind & Ponack
ATTORNEYS

SEIICHI SUZUKI
INVENTOR

Feb. 18, 1958 SEIICHI SUZUKI 2,823,423
AUTOMATIC CARD STRIPPER
Filed May 24, 1954 7 Sheets-Sheet 5

SEIICHI SUZUKI
INVENTOR

BY Wenderoth, Lind & Ponack
ATTORNEYS

Feb. 18, 1958  SEIICHI SUZUKI  2,823,423
AUTOMATIC CARD STRIPPER
Filed May 24, 1954  7 Sheets-Sheet 6

SEIICHI SUZUKI
INVENTOR.

BY *Wenderoth, Lind & Ponack*
ATTORNEYS

SEIICHI SUZUKI
INVENTOR.

BY Wenderoth, Lind & Ponack
ATTORNEYS

1

2,823,423

AUTOMATIC CARD STRIPPER

Seiichi Suzuki, Takarazuka, Hyogo-ken, Japan

Application May 24, 1954, Serial No. 431,944

Claims priority, application Japan November 12, 1953

3 Claims. (Cl. 19—109)

The present invention relates to stripping apparatus for carding machines. The principal object of the present invention is to provide means to remove fiber waste accumulated on the carding cylinder and on the doffer. Another object of the present invention is to provide means to prevent waste of fiber, by which means the fiber waste removed from the carding cylinder may be fed back to the said cylinder for further carding after reduction and disposal of the rubbish.

According to the present invention, the stripping means may consist of a suction nozzle having a suction opening elongated in the circumferential direction of the carding cylinder or doffer and fixed to a traversing member movable parallel to the axes of the carding cylinder and the doffer. The nozzle may be provided with means automatically operable for its opening and closing.

The other features of the present invention will be apparent from the following description and accompanying drawings, in which.

Figure 1:
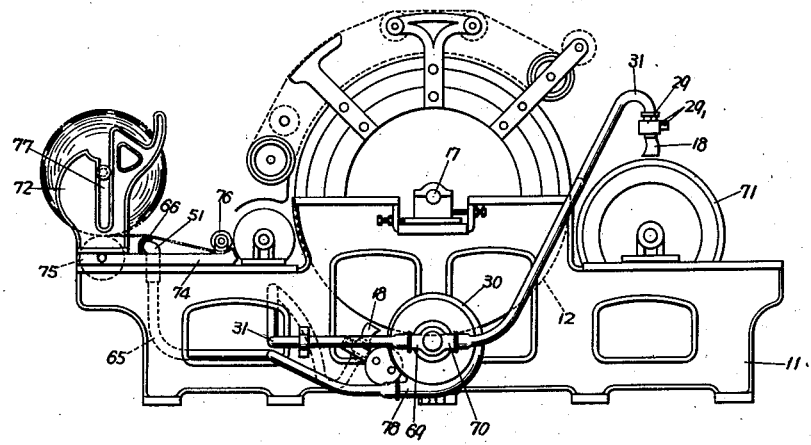
Figure 1 is an end view of a carding machine according to the present invention.
Figure 2:
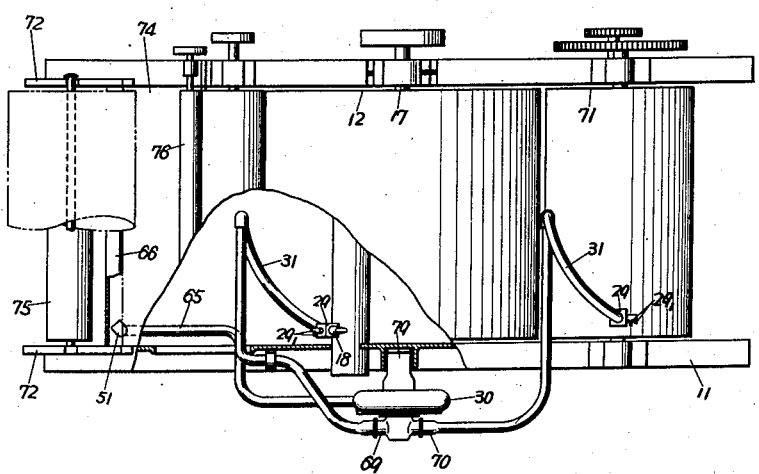
Figure 2 is a plan view, partly broken away, of a carding machine as shown in Figure 1.
Figure 3:
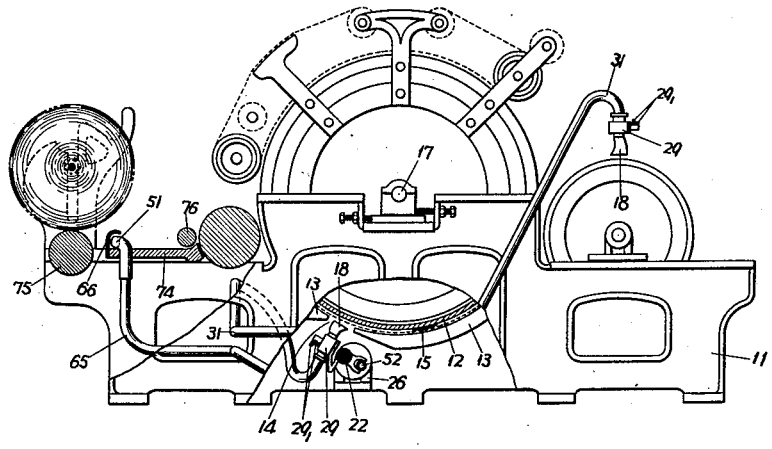
Figure 3 is an end view of the carding machine of Figure 1, partly in section.

In the drawings is shown a carding cylinder 12 having wire teeth 15 on a carding machine 11. In a gap 14 in a lower casing 13 around the lower part of cylinder 12 is located a suction nozzle 18 having a suction opening 16 elongated in the circumferential direction of the carding cylinder 12 or doffer cylinder 71, the elongation being such that at least the leading ends of the fibers, i. e. those first passing the suction opening as the carding cylinder rotates, are stripped from the carding cylinder between the ends of the elongated nozzle. Preferably the entire length of the fibers is stripped from the carding cylinder during its passage past the elongated suction opening 16, the leading ends being pulled from the cylinder between the ends of opening 16 and the remainder of the length of the fibers following without touching the ends of the opening. In operation, the nozzle 18 is made to traverse the width of the carding machine in a direction parallel to the axis 17 of cylinder 12. A lead screw 22 is inserted in a sleeve 19 supported by brackets 26 and 27 at each end of the cylinder 12. On the sleeve 19 a carriage 21 is slidably mounted, on which carriage teeth 23 are fixed so as to engage with the lead screw 22 through a groove 20 in the sleeve 19. A yoke 24 is mounted on the carriage 21 to engage a guide sleeve 25 supported between the brackets 26 and 27 with its axis parallel to that of the lead screw 22.

A valve 29 fixed to the carriage 21 by a bracket 28 has the suction nozzle 18 mounted thereon, and a suction pipe 31, which is connected with a vacuum fan 30 mounted on frame 11 by brackets 79, is attached to valve 29. On the brackets 26 and 27 are fixed push rods 32 and 33 which operate arms $29_1$ of the valve 29 to open or close it. Holes 34 are bored at upper portions of the brackets 26 and 27, and pins 35 and $35_1$ are inserted therein and are pressed downwardly by springs 37 to fit into grooves 38 and $38_1$ on the ends of lead screw 22. Holes 39 and $39_1$ are bored in the pins 35 and $35_1$ to receive tapered ends 40 and $40_1$ of a rod 41 fixed to the carriage 21 when the carriage reaches at the ends of its traverse movement. When the ends of the rod 41 are inserted into the holes 39 and $39_1$, they lift the pins 35 and $35_1$ and the lead screw 22 becomes free for traverse motion.

Figure 5:
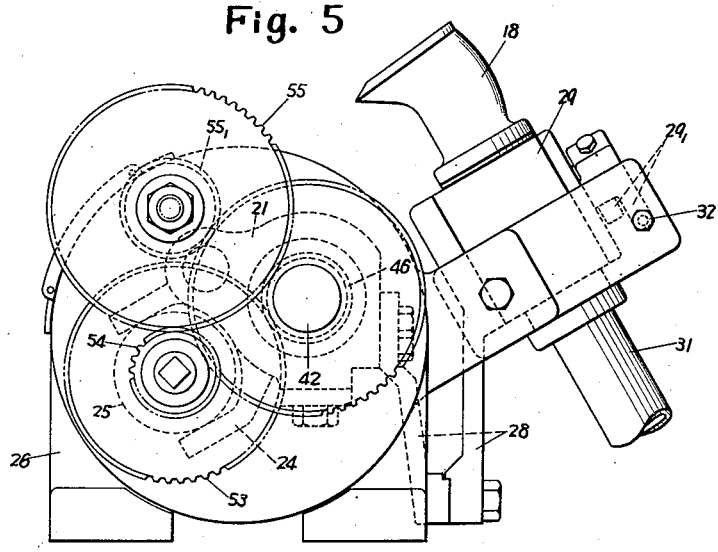
Figure 5 is an end view of the form of the invention as shown in Figure 4.

On a shaft 52 inserted in a guide sleeve 25 gears 53 and 54 are mounted, and the gear 54 is engaged with an intermediate gear 55. Another intermediate gear $55_1$ is engaged with a gear 45 mounted on the end 42 of lead screw 22. The gear 53 engages with a gear 46 (Figure 5) mounted on the lead screw 22. A holder fixed to the bracket 26 prevents the gears 45 and 46 from movement in a longitudinal direction with respect to lead screw 22. A toothed clutch 48 on the gear 45 is engageable with a toothed clutch 44 fixed to the lead screw 22. A toothed clutch 47 on the gear 46 is engageable with a toothed clutch 43 fixed to the lead screw 22. When the gear 46 and gear 53 are disengaged from lead screw 22, and gears 45 and $55_1$ are engaged with lead screw 22 through clutches 48 and 44, the lead screw 22 is driven by the shaft 52 so as to rotate in one direction, and when gears 45 and $55_1$ are disengaged and gears 53 and 46 are engaged to the lead screw through clutches 47 and 43, the lead screw rotates in the opposite direction.

Figure 4:
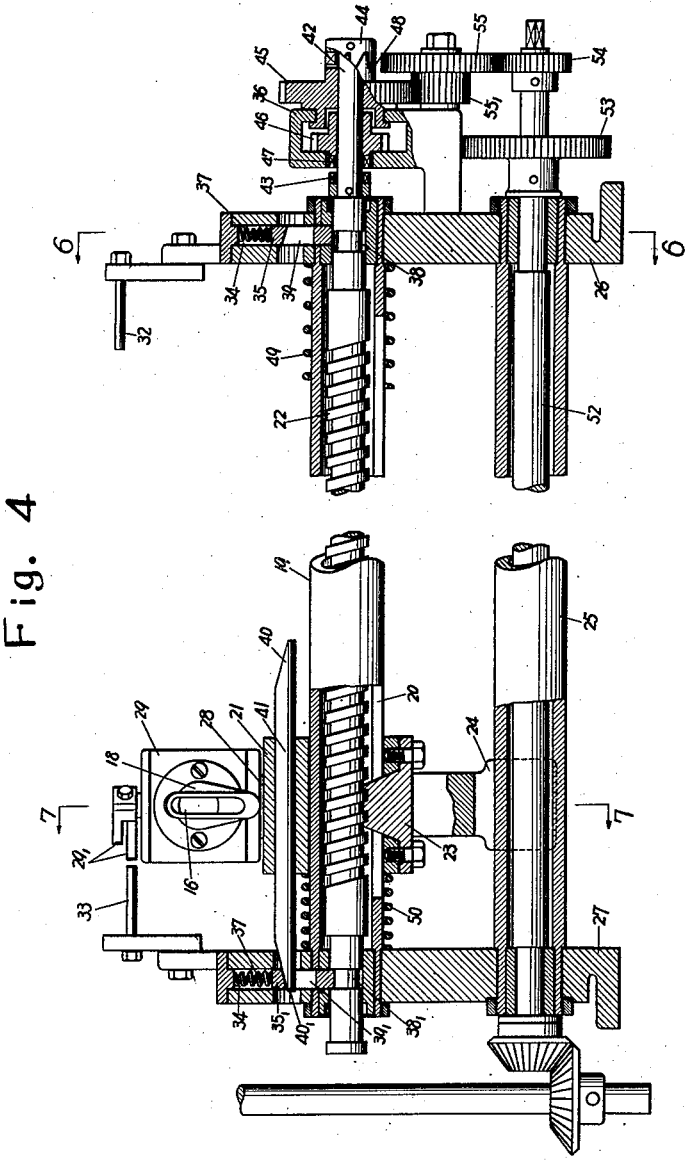
Figure 4 is an elevation, partly in section, of one form of stripping and traversing means according to the present invention.
Figure 6:
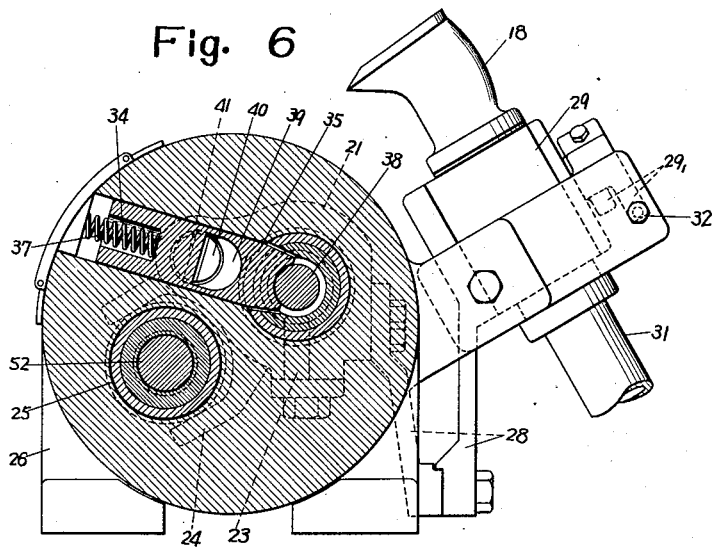
Figure 6 is a sectional view on the line 6—6 of Figure 4.
Figure 7:
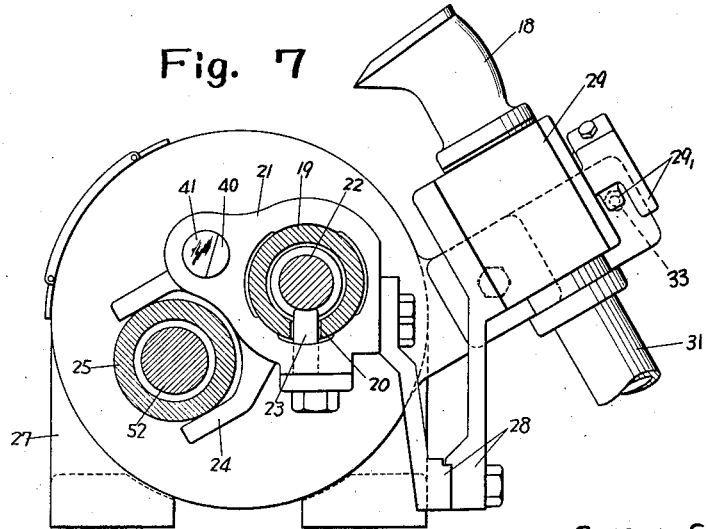
Figure 7 is a sectional view on the line 7—7 of the same.
Figure 9:
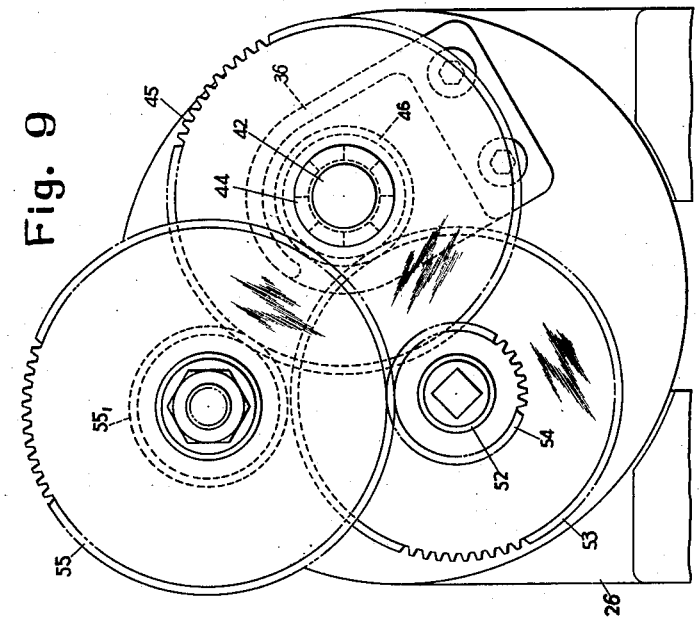
Figure 9 is an end view of the Figure 8.
Figure 8:
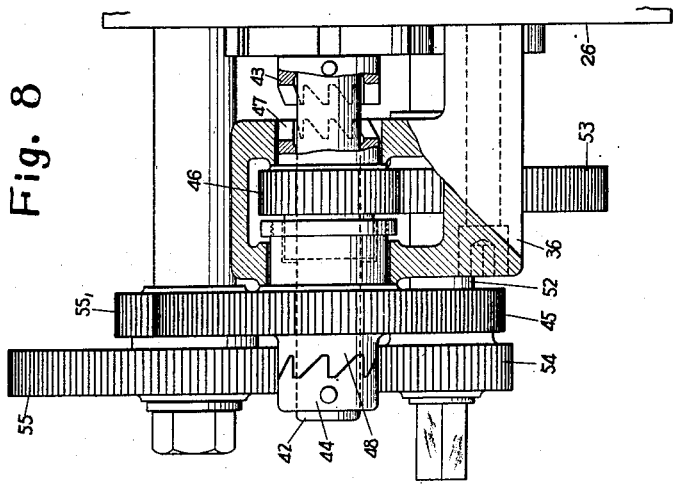
Figure 8 is an enlarged elevation, partly in section, of the clutches as shown in Figure 4.
Figure 10:
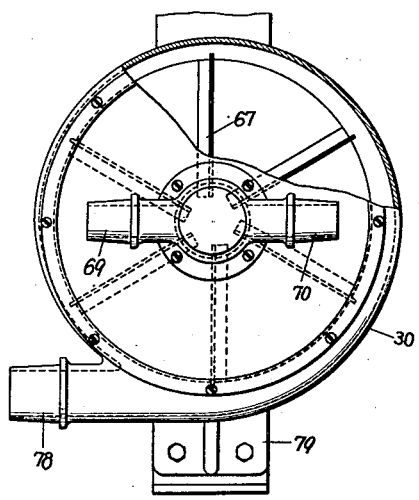
Figure 10 is an elevation of one form of fan means according to the present invention.
Figure 11:
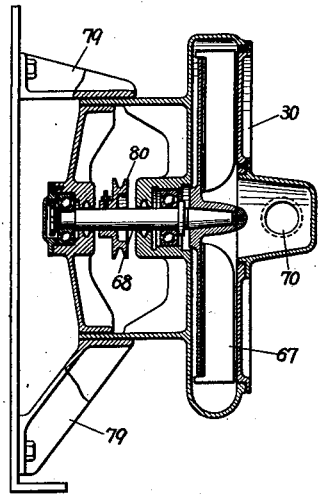
Figure 11 is a sectional side view of the form of the fan means as shown in Figure 10.
Figure 12:
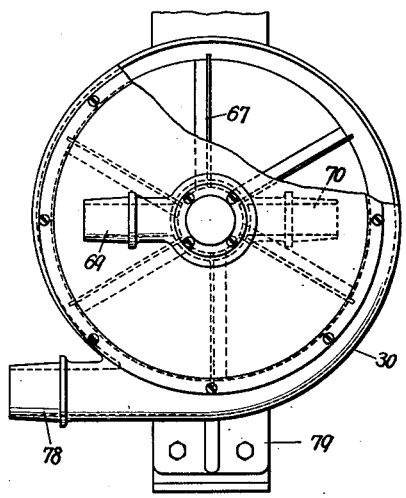
Figure 12 is an elevation of another form of fan means according to the present invention.
Figure 13:
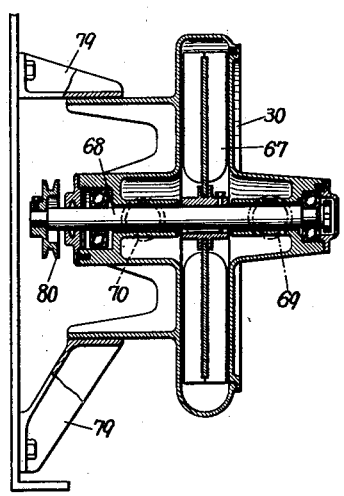
Figure 13 is a sectional side view of the form of the fan means as shown in Figure 12.
Figure 14:
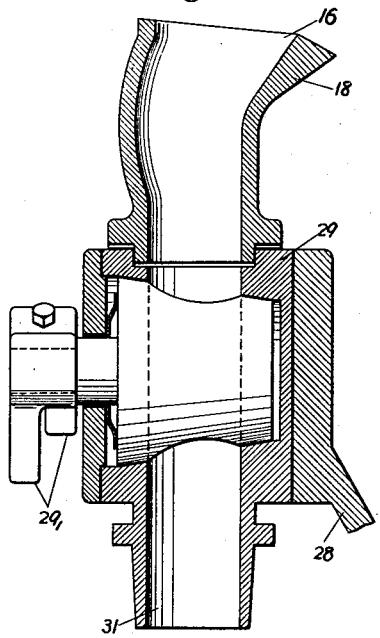
Figure 14 is an enlarged sectional view of a valve according to the present invention.
Figure 15:
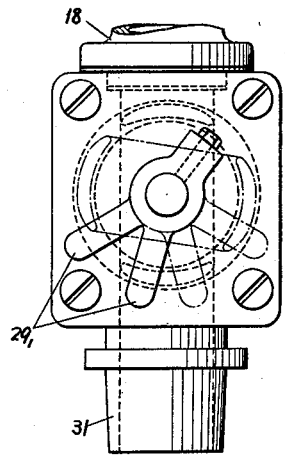
Figure 15 is an enlarged elevation of the valve as shown in Figure 14.

When the carriage 21 arrives at the end of its traverse movement as shown in Figure 4, the tapered end $40_1$ is inserted into the hole $39_1$ so as to lift the pin $35_1$. At the same time, one of the arms $29_1$ of the valve 29 is operated by the push rod 33 so as to close the valve. The carriage 21 is stopped by a buffer spring 50, and then the lead screw 22 is further moved by the teeth 23. Movement of the tapered end $40_1$ to the left (as viewed in Figure 4) causes the pin $35_1$ to rise slowly from the reduced portion or groove $38_1$ in the lead screw 22. At the same time compression of spring 50 occurs due to the movement of the carriage 21 thereagainst. Since the movement of the pin $35_1$ from groove $38_1$ is relatively slow, by the time the tapered end $40_1$ causes complete raising of the pin from the groove, spring 50 has been considerably compressed by the movement of the carriage. When the pin $35_1$ is completely removed from the groove $38_1$ the spring 50 pressing against the carriage 21 causes the carriage to tend to move to the right (in Figure 4). The screw 22 (upon removal of the pin from the groove) is now slidable longitudinally with respect to sleeve 19. Spring 50 pressing against the carriage 21, which contains the teeth 23, drives screw 22 to the right (as viewed in Figure 4) until the groove 38 is engaged by the pin 35. Then the clutch 48 disengages from the clutch 44, the clutch 43 engages with the clutch 47, and the lead screw 22 is rotated in the reverse direction to make the carriage 21 return until it is stopped by a buffer spring 49. During the transverse movement of the carriage 21, the suction means are inoperative.

When the carriage 21 arrives at the end of its traverse movement to the right (in Figure 4), the tapered end 40 is inserted into the hole 39 so as to lift the pin 35. At the same time, another one of the arms $29_1$ of the valve 29 is operated by the push rod 32 so as to open the valve and the suction means is actuated. At the same time, compression of spring 49 occurs due to the movement of the carriage 21 thereagainst. When the pin 35 is completely removed from the groove 38 the spring 49 pressing against the carriage 21 causes the carriage to tend to move to the left (in Figure 4). The screw 22 is now slidable longitudinally with respect to sleeve 19. Spring 49 pressing against the carriage 21, which contains the teeth 23, drives the screw 22 to the left (in Figure 4) until the groove $38_1$ is engaged by the pin $35_1$. Then the clutch 43 disengages from the clutch 47, the clutch 44 engages with the clutch 48, and lead screw 22 is rotated in the reverse direction to make the carriage 21 return until it is stopped by a buffer spring 50 and suction is being applied to the carding cylinder during the traverse movement.

The traverse movement of the carriage 21 while suction is being applied to the carding cylinder will take about 23 minutes, while the return motion, during which the suction means are inoperative, will take about 2½ minutes.

The process of stripping the doffer cylinder 71 is similar to that described with reference to the carding cylinder 12. The fibers and waste stripped from the cylinder 12 or from the doffer cylinder 71 will pass through a pipe 31 and suction openings 69 or 70 of the fan to the vacuum fan 30 and then through a pipe 65 to an exhaust nozzle 51. An axle 68 of impeller 67 is rotatably mounted on the fan 30, and is driven by a pulley 80 to create the suction and to blow the fibers through an exhaust opening 73 to a pipe 65. The fibers and waste will then be blown against a curved upright projection 66. The lap is fed into the carding machine from a lap rod driven by a lap roll 75, the axle of the lap rod being guided in slots 77 in plates 72. The lap is guided over the top edge of plate 66, which is curved in the direction of feed of the lap, across the feed plate 74 and under feed roll 76, over the nose of the feed plate and to the licker-in by which it is fed onto the carding cylinder 12. The stripped fibers blown against the projection 66 will be distributed on the surface of the lap and will adhere thereto, and the air by means of which the fibers are carried will pass through the lap and escape into the surrounding atmosphere. A similar structure may be utilized to return the fibers to the top of the lap, the air then escaping from beneath the lap. If desired, the fiber stripped from the doffer 71 may be disposed of separately without being fed back to the cylinder 12.

Figure 16:
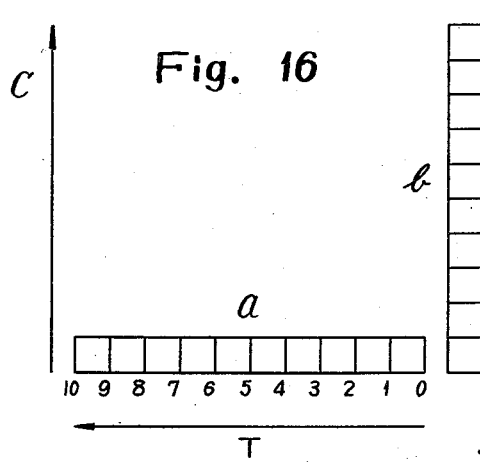
Figure 16 is a diagram illustrating the stripping effect of the present invention as compared with that of known stripping means.

The efficiency of the suction opening 16 is illustrated with reference to Figure 16, in which the longitudinal axis C and transverse axis T indicate the directions of the rotation of the cylinder 12 and the traverse direction of the stripping means respectively. At $a$ is represented a suction opening which is of ordinary shape, and at $b$ is represented the opening 16 according to the present invention. Assuming that $a$ and $b$ have equal suction areas and that suction pressure of 200 mm. water column is applied through each opening, which in the diagram is shown divided into ten sections. As the cards pass the opening $a$ a suction of 200 mm. pressure will be exercised, but as the cards pass the opening $b$, the pressure of 200 mm. will be applied in each of the ten sections as the cylinder rotates, the pressure thus lasting ten times as long as in case of opening $a$. Thus the stripping will be performed more thoroughly and effectively by the suction opening $b$ according to the present invention, than by the opening $a$.

Having thus described the present invention, what is claimed and desired to be secured by Letters Patent is:

1. Stripping apparatus for a carding cylinder or a doffer cylinder in carding machines having the carding cylinder and the doffer cylinder each rotatably mounted between end brackets, comprising a hollow sleeve with a longitudinal slot therein mounted between said brackets adjacent the cylinder, a carriage having a plurality of teeth thereon sidably mounted on said sleeve, a valve on said carriage, a suction nozzle on said valve having a suction opening elongated in the circumferential direction of the cylinder adjacent the surface of the cylinder, a lead screw rotatably and slidably mounted in said sleeve with the teeth on said carriage engaged with said lead screw, the lead screw having a circumferential groove in each end thereof, gear and clutch means on said lead screw adapted to drive said screw in either direction, a push rod on each bracket adapted to engage said valve when said carriage is next to a bracket to operate said valve, a rod having tapered ends mounted on said carriage, each bracket having a hole therein extending from said hollow sleeve, and a pin in each hole having an elongated opening therein adapted to receive a tapered end of said rod, the ends of said pins engageable in the circumferential grooves in the ends of said lead screw, whereby when said carriage reaches a point adjacent a bracket, a tapered end of the said rod enters the elongated hole in the pin in said bracket to withdraw the pin from the groove in said lead screw.

2. A stripping apparatus for carding machines having a carding cylinder, comprising in combination suction means having a suction opening elongated in the circumferential direction of the carding cylinder, the elongation being such that at least the leading ends of the fibers collected on the carding cylinder are stripped from the carding cylinder between the ends of the elongated nozzle, traversing means for moving said suction means parallel to the axis of the cylinder, fan means for pumping air and fibers from said suction means through said fan means, and a feed plate over which the lap is passed as it is fed to the carding cylinder, said plate having means thereon for spacing the lap from said plate as the lap passes thereover, said fan means discharging air and fibers stripped from said cylinder between said plate and the lap.

3. A stripping apparatus for carding machines having a carding cylinder, comprising in combination a suction nozzle having a suction opening elongated in the circumferential direction of the cylinder, the elongation being such that the fibers collected on the carding cylinder are completely stripped from the carding cylinder between the ends of the elongated nozzle, traversing means for moving said suction means parallel to the axis of said cylinder, a fan, piping from said nozzle to said fan through which is pumped air and fibers from said suction nozzle, a feed plate over which the lap is passed as it is fed to the carding cylinder, said plate having an upright projection thereon with the top edge curved in the direction of movement of the lap for spacing the lap from said plate as the lap passes thereover, and further piping through which said fan discharges air and fibers between said plate and the lap.

(References on following page)

References Cited in the file of this patent

UNITED STATES PATENTS

| | | |
|---|---|---|
| 1,962,945 | Wilkinson | June 12, 1934 |
| 2,248,863 | Goldsmith | July 8, 1941 |
| 2,294,336 | Goldsmith | Aug. 25, 1942 |
| 2,327,349 | Goldsmith | Aug. 24, 1943 |
| 2,428,255 | White et al. | Sept. 30, 1947 |
| 2,433,810 | Clark | Dec. 30, 1947 |
| 2,464,425 | White | Mar. 15, 1949 |
| 2,481,002 | Castell | Sept. 6, 1949 |
| 2,541,407 | Clark | Feb. 13, 1951 |
| 2,585,776 | Hermanek | Feb. 12, 1952 |

FOREIGN PATENTS

| | | |
|---|---|---|
| 208,016 | Great Britain | Dec. 13, 1923 |